United States Patent [19]

Gaehring et al.

[11] Patent Number: 4,504,504

[45] Date of Patent: Mar. 12, 1985

[54] TEXTURE PRESERVATION FOR DICED FRESH FOOD PRODUCTS USING GELLED POLYURONIC ACIDS

[75] Inventors: David P. Gaehring, Collingswood; John V. Scanlon, Haddonfield, both of N.J.

[73] Assignee: Campbell Soup Company, Camden, N.J.

[21] Appl. No.: 475,021

[22] Filed: Mar. 14, 1983

[51] Int. Cl.³ .................. A23B 7/14; A23L 1/216; A23L 1/212; A23L 1/04
[52] U.S. Cl. ..................... 426/321; 426/577; 426/615; 426/637; 426/442
[58] Field of Search ............... 426/321, 615, 131, 323, 426/573, 637, 442, 577

[56] References Cited

U.S. PATENT DOCUMENTS

| | | | |
|---|---|---|---|
| 2,437,937 | 3/1948 | Childs et al. | 426/321 |
| 2,492,735 | 12/1949 | Conard et al. | 426/324 |
| 2,791,508 | 5/1957 | Rivoche | 426/573 |
| 3,010,831 | 11/1961 | Rivoche | 426/321 |
| 3,687,688 | 8/1972 | Stapley et al. | 426/637 |
| 3,922,360 | 11/1975 | Sneath | 426/573 |

FOREIGN PATENT DOCUMENTS 944604  4/1974  Canada.
1920211  4/1969  Fed. Rep. of Germany ...... 426/615

OTHER PUBLICATIONS

Palaez and Karel, "Improved Method for Preparation of Fruit-Simulating Alginate Gels", *Journal of Food Processing and Preservation*, 5, (1981), pp. 63–81.
Littlecott, *South African Food Review*, 7 (3), 18, 20, 23, 25–26, (1980), "Alginates in Modern Processed Foods".

*Primary Examiner*—Raymond Jones
*Assistant Examiner*—Elizabeth C. Weimar
*Attorney, Agent, or Firm*—Banner, Birch, McKie & Beckett

[57] ABSTRACT

The present invention describes a process for preserving the natural texture of diced, pectin-containing fresh fruit and vegetable products through the rigors of conventional heat and acid sterilization procedures. Fruit or vegetable products are first impregnated with an aqueous polyuronic acid-containing solution and are thereafter contacted with an aqueous source of divalent metal cations for gelling the absorbed acid.

11 Claims, No Drawings

TEXTURE PRESERVATION FOR DICED FRESH FOOD PRODUCTS USING GELLED POLYURONIC ACIDS

BACKGROUND OF THE INVENTION

1. Field of the Invention

The present invention relates to the art of food preservation and pertains specifically to a method which uses gelled polyuronic acids to more successfully preserve the natural texture of diced, fresh fruit and vegetable products.

2. Description of the Prior Art

In a widely used procedure for canning diced tomatoes and other diced fruits and vegetables, an initial treatment step with steam or caustic facilitates removal of the food product's outer skin. Thereafter, the food product is diced to the desired size and is blended with appropriate additives for firming the dices and preventing spoilage. A soluble source of calcium, e.g., calcium chloride, is a well-known additive for enhancing texture in such materials. Calcium ions absorbed into the dices reinforce the inter-cellular structure, presumably by forming crosslinks with natural pectin in the material. Citric acid is added as a pH control to enhance flavoring and more importantly to retard spoilage. Generally, the food product is then heat treated, either before or after the canning operation, to inactivate molds and yeasts.

Unfortunately, heat and acid sterilization treatments typically cause a marked deterioration in the shape, particle size and texture of canned fruit or vegetable products, even after thorough treatment with a soluble calcium source, e.g., calcium chloride. For this reason, development of an improved canning procedure which provides better retention of the food product's original texture would represent an important advance in the canning art. It has now been discovered that by incorporating a gelled polyuronic acid, e.g., calcium alginate, in the diced, fresh fruit or vegetable product an improvement in texture is obtained.

Calcium alginate has been used previously to encapsulate macerated fruits and berries. In this prior procedure, a soluble calcium source, e.g., aqueous calcium chloride solution, is initially blended with macerated material and a drop of the mixture is thereafter contacted with alginate solution, eg. an aqueous solution of sodium alginate. After suitable contacting, a gel forms around the drop, and quickly thickens until it becomes virtually impenetrable by surrounding alginate solution. If desired, excess alginate solution retained on the drop can be gelled by treatment with additional calcium salt solution. A similar procedure has also been used to encapsulate flavoring agents for ice cream, custard, jelly and the like. A primary disadvantage of this procedure is that the natural texture of the original food product is destroyed by maceration. It should also be noted that this procedure is designed merely to encase pureed material in a shell of gelled alginate.

In another prior art procedure, a calcium alginate gel is formed within and around dehydrated food products by initially impregnating the partially dehydrated food product with calcium salt solution, followed by further vacuum dehydration and then rapid impregnation with alginate solution. The initial dehydration step tends to rupture the cellular structure of the material, creating numerous channels and capillaries into its interior. Generally, on rehydration damage done to the food's cellular structure becomes evident as a total loss in the materials natural texture. This prior art process attempts to avoid this problem on reconstitution apparently by forming a secondary structure or skeleton of a gelled hydrocolloid throughout the inner-channeled matrix produced by the initial dehydration. As disclosed, this process may be used prior to canning the food product, and it is claimed that such treatment enables the food product to retain its initial shape and appearance after freezing and thawing or after cooking. Unfortunately, the dehydration step not only alters the natural texture of the fresh food product but also removes various juices and flavoring constituents from the product generally making it less palatable. Moreover, even though the coating penetrates the exterior surface of the material through the artificially created channels, this technique merely coats the food substrate with a gel as in the prior procedure.

It is an object of the present invention to provide a method for treating diced, fresh fruit and vegetable products that preserves their natural texture even through the rigors of conventional canning procedures.

It is another object of this invention to provide a method for treating diced, fresh fruit and vegetable products so that their natural texture is not significantly altered by conventional heat and acid sterilization procedures.

SUMMARY OF THE INVENTION

In accordance with these and other objectives, the present invention pertains to a process for preserving the natural texture of a diced, pectin-containing, canned fresh fruit or vegetable product comprising the steps of:

(a) contacting said diced, pectin-containing fresh fruit or vegetable product with an aqueous polyuronic acid-containing solution so as to absorb said polyuronic acid into the natural cellular structure of said fruit or vegetable product and thereby form a polyuronic acid-impregnated product, and (b) contacting said polyuronic acid-impregnated, diced pectin-containing, fresh food product with an aqueous solution of di-valent metal cations for gelling the absorbed polyuronic acid.

The present invention also pertains to an improved pectin-containing, diced, fresh fruit or vegetable product having a matrix of absorbed polyuronic acid cross-linked with natural pectin in said diced fresh fruit or vegetable product through di-valent cation linkages wherein said cross-linking helps to better preserve the food product's natural texture during conventional processing.

As used throughout the specification and claims the phrase "canned fresh fruit or vegetable product" includes not only fruit or vegetable products canned using conventional canning technology, but also includes fruit or vegetable products packaged in alternate containers, e.g., plastic bags, so long as the diced material is substantially fresh when initially containerized.

When used in the specification and claims the term "pectin-containing" refers to fruit or vegetable products containing polygalacturonic acid and includes such fruits and vegetables as apples, peaches, apricots, pears, tomatoes, cucumbers, celery, carrots and potatoes.

DETAILED DESCRIPTION OF THE INVENTION

The present invention is based upon the discovery that the formation of a polyuronic acid gel throughout the natural cellular structure of diced, pectin-containing fresh fruit or vegetable products helps to preserve the original texture of the fruit or vegetable products even through the rigors of heat and acid sterilization procedures. Such procedures have generally caused a noticeable deterioration in the shape, particle size and texture of diced materials. By permeating the existing cellular and fibrous structure with polyuronic acid gel, the natural structure of the fruit or vegetable product is better preserved. Consequently, this method also tends to retard the loss of natural juices and flavors within the material.

According to this invention, the fresh fruit or vegetable product can be peeled, if necessary, using any conventional process. For example, in conventional tomato canning the whole fruit will generally be treated with steam or caustic. This treatment causes the outer skin of the fruit to separate from the meat of the fruit. The loosened skin is then easily removed, e.g., by a water wash or mechanical abrasion.

The whole peeled tomatoes are then diced to the desired particle size and shape, using well known techniques. While a wide variety of shapes and sizes are possible, uniformly sized and shaped dices are preferably prepared so as to maintain homogeneity in the final product. The size and shape of the dices are preferably selected to yield a large surface to volume ratio. A surface to volume ratio above about 6 $in^2/in^3$ is particularly preferred. As the surface to volume ratio of the dices increases the time needed to satisfactorily impregnate the food material with the aqueous polyuronic acid-containing solution decreases, thereby improving the economics of the process.

The dices are thereafter contacted with an aqueous polyuronic acid-containing solution so as to thoroughly impregnate the dices with the polyuronic acid. In order to realize maximum advantage from the present invention, at least 50% of the dice's volume should be impregnated. The polyuronic acids are polysaccharide-like compounds in which the primary alcohol group (position 6) has been oxidized to a carboxyl group. The present invention preferably employs a derivative of alginic acid, i.e., an alginate. Alginic acid is a polysaccharide composed of D-mannuronic and L-glucuronic acid residues linked at positions 1 and 4 through a beta glycosidic linkage. The alginates are known hydrophillic collids. Materials found suitable for preparing the polyuronic acid solution include Kel Set, Keltone, Kelgin LV, and Kelgin HV, all obtained from Kelco, a Division of Merk, Sharp & Dome, Rahway, N.J., other sodium alginates. Of these materials, Keltone is preferred because it provides an extremely firm texture.

The dices are contacted with the solution so as to absorb polyuronic acid solution into their intercellular structure. Generally, the dices will be immersed in a bath of the polyuronic acid-containing solution. Preferably, the concentration of polyuronic acid in the solution is at least 0.5 percent (by weight). Normally, lower concentrations are not used because the rate and extent of polyuronic acid absorption is less than desired. Alternatively, concentrations above about 3% are generally avoided because such high concentrations are not necessary to achieve the results desired.

The time of immersion will depend upon the size of the dices, the concentration of polyuronic acid in the solution bath, and the degree of absorption desired, as will be recognized by one of ordinary skill. Preferably, the dices are immersed for between about 1 to about 10 minutes in the aqueous polyuronic acid-containing solution. In treating cubic tomato dices of approximately 0.5 cubic inch in volume, for example, immersion in a 1.0 percent (by weight) bath of sodium alginate for about 5 minutes will generally be sufficient.

While the preferred technique for impregnating diced material with aqueous poluuronic acid solution is to submerge or immerse the dices in an appropriate aqueous bath, it may also be possible in certain circumstances to impregnate the dices by spraying. Any excess solution preferably should be drained from the dices. This is particularly important to the present invention which requires gellation of absorbed polyuronic acid solution throughout the inter-cellular structure of the dices. If excess solution is allowed to remain on the dices, then subsequent treatment with soluble di-valent cation solution may cause a gelled coating to rapidly encapsulate each dice. This coating would most likely impair diffusion of di-valent cations into the dices' cellular structure needed for texture enhancement. As will be described hereinafter, it may be possible in some circumstances to mimimize this problem somewhat by employing a non-soluble di-valent cation source which subsequently becomes soluble within the inter-cellular structure of the dices.

The polyuronic acid-impregnated dices are then contacted with a source of di-valent cations. Suitable cations include calcium and aluminum. A particularly suitable source is an aqueous solution of calcium chloride. Preferably, about a 0.5 to about a 10.0 molar solution of calcium cations should be used. Alternate sources of soluble calcium cations include calcium acetate, lactate and citrate. Preferably, the polyuronic acid-impregnated dices will be mixed with the aqueous source of di-valent cations for about 1 to 10 minutes to ensure satisfactory permeation of the cation source into the dices. When treating 1.0 cubic inch dices of tomatoes for example, mixing the dices with a 1.5 molar solution of calcium cations for about 5 minutes will generally be sufficient.

As noted, the di-valent cation source preferably comprises an aqueous solution of di-valent cations. This provides a suitable vehicle for cations to rapidly diffuse into the inter-cellular structure of the dices for subsequent cross-linking with previously absorbed polyuronic acid anions. As noted above, it may also be possible in some circumstances to supply the dices with an aqueous suspension or dispersion of an insoluble salt of the desired di-valent cation, e.g., calcium carbonate or calcium phosphate. An aqueous solution of the di-valent cation is then formed in-situ by solublization of the insoluble salt through the action of an acid, which may be the natural acidity of the fruit or vegetable itself. However, in order for this technique to be successful, sufficient inter-cellular penetration of the cation source must occur prior to release of soluble cationic species and gellation so that sufficient texture enhancement is achieved. Otherwise, only an encapsulating gel is formed around the dice and the internal structure of the dice is not effectively reinforced.

Usually, food grade acid, e.g., citric acid, will be added to the diced material for pH control, so as to retard spoilage. This can generally be done either before or after treating the diced food product according to this invention. Preferably, the aqueous di-valent cation solution includes the food grade acid.

Before final canning, the diced material is then heat sterilized. For example, steam blanching the dices at a temperature of 205° F. for 3 minutes will often be suitable.

Pectin-containing food products for which the present invention is believed to be applicable include apples, peaches, apricots, pears, tomatoes, cucumbers, celery, carrots and potatoes. The present invention is particularly useful for treating tomato dices. As is well-known, the natural texture of tomatoes is significantly degraded by conventional heat and acid sterlization procedures. A substantial improvement in texture retention is provided by the present invention.

Cross-linking polyuronic acids, e.g., alginates, by the addition of di-valent cations, e.g., calcium, is well-known. However, diced, pectin-containing, fresh food products subjected to the procedure of the present invention exhibit a firmness that cannot be explained solely by the presence of a gelled coating. Although applicants do not wish to be bound by any particular theory, it is believed that a unique molecular interaction, i.e., further cross-linking, occurs between natural pectin in the dices and polyuronic acid absorbed into the dices. Presumably, di-valent cations originally present in the fruit or vegetable product, as well as those cations added during processing, form a link not only between contiguous chains of absorbed polyuronic acid, but also between the dice's natural pectin and absorbed polyuronic acid chains. It is this three dimensional interaction between the gelled matrix of polyuronic acid and pectin that presumably enhances the preservation of the diced fresh fruit or vegetable product's natural texture, as has been observed in food products treated according to the present invention.

The following example describes a preferred procedure for practicing the present invention.

EXAMPLE

Fresh tomatoes, previously washed and peeled, were diced in cubes having a volume of about one cubic inch. About a half pound of the diced tomatoes were then soaked for about 1 minute in 200 grams of a 1% by weight aqueous solution of Kelgin MV. Kelgin MV is a sodium alginate obtained from Kelco, a division of Merk, Sharp & Dome, Rahway, N.J. The tomato dices were thereafter drained and then mixed with an aqueous solution of di-valent calcium cation. The di-valent cation solution was prepared by mixing 10 grams of calcium chloride and 31 grams of anhydrous citric acid with 60 grams of water. The dices were contacted with the calcium chloride solution for about 5 minutes. The dices were therafter drained, heated to 250° F. and then canned. Subsequent examination of the dices showed that this procedure provided excellent texture retention.

Although preferred embodiments of this invention have been discussed herein, those skilled in the art will appreciate that changes and modifications may be made without departing from the spirit of this invention, as defined in and limited only by the scope of the appended claims.

We claim:

1. A method for preserving the naural texture of a diced pectin-containing fresh fruit or vegetable product suitable for canning comprising the steps of:
    (a) contacting said diced, pectin-containing fresh fruit or vegetable product with aqueous polyuronic acid-containing solution for a period of time sufficient to absorb said polyuronic acid into the natural cellular structure of said fruit or vegetable product and thereby form a polyuronic acid-impregnated product, and
    (b) contacting said polyuronic acid-impregnated, diced, pectin-containing fresh food product with an effective amount of an aqueous source of di-valent metal cations to cause gelation of said absorbed polyuronic acid.

2. A method according to claim 1 wherein said diced, pectin-containing fresh fruit or vegetable product is selected from the group consisting of apples, peaches, apricots, pears, tomatoes cucumbers, celery, carrots and potatoes.

3. A method according to claim 1 wherein said diced, pectin-containing fresh fruit or vegetable product is immersed in an aqueous bath of polyuronic acid in step (a).

4. A method according to claim 3 wherein said diced, pectin-containing fresh fruit or vegetable product has a surface to volume ratio of at least 6 $in^2/in^3$.

5. A method according to claim 4 wherein said diced product is immersed in said bath for at least 5 minutes.

6. A method according to claim 1 wherein said aqueous polyuronic acid-containing solution comprises an aqueous solution of sodium alginate at a concentration of at least about 0.5 percent by weight.

7. A method according to claim 1 wherein said di-valent metal cation is selected from the group consisting of calcium and aluminum.

8. A method according to claim 7 wherein said polyuronic acid-impregnated diced fresh food product is contacted with an aqueous solution of calcium chloride.

9. A method according to claim 6 wherein excess aqueous polyuronic acid-containing solution is drained from said diced fresh food product prior to said contacting with sid aqueous solution of di-valent metal cations.

10. A diced, pectin-containing fresh fruit or vegetable product having a gelled matrix of absorbed polyuronic acid, said gelled matrix being cross-linked through di-valent cation linkages with natural pectin in said diced product, wherein said cross-linking helps to preserve the natural texture of said diced fresh food product.

11. The diced, pectin-containing fresh fruit and vegetable product of claim 10 selected from the group consisting of apples, peaches, apricots, pears, tomatoes, cucumbers, celery, carrots and potatoes.

* * * * *